US006369303B1

(12) United States Patent
Hvezda

(10) Patent No.: US 6,369,303 B1
(45) Date of Patent: Apr. 9, 2002

(54) SHOULDER REST FOR VIOLIN OR LIKE INSTRUMENT

(76) Inventor: Jaroslav Marius Hvezda, RR No. 1, Ompah, Ontario (CA), K0H 2J0

( * ) Notice: Subject to any disclaimer, the term of this patent is extended or adjusted under 35 U.S.C. 154(b) by 0 days.

(21) Appl. No.: 09/662,005

(22) Filed: Sep. 14, 2000

(30) Foreign Application Priority Data

Sep. 30, 1999 (CA) ............................................ 2284807

(51) Int. Cl.[7] .................................................. G01D 1/02
(52) U.S. Cl. .............................. 84/278; 84/279; 84/280
(58) Field of Search ........................... 84/278, 279, 280

(56) References Cited

U.S. PATENT DOCUMENTS

| | | | | |
|---|---|---|---|---|
| 2,110,023 A | | 3/1938 | McGowan | 84/280 |
| 2,478,530 A | | 8/1949 | Hall | 84/280 |
| 2,489,101 A | | 11/1949 | Mills | 84/280 |
| 2,652,739 A | | 9/1953 | Hall | 84/280 |
| 2,746,336 A | | 5/1956 | Bisharat | 84/280 |
| 3,631,754 A | | 1/1972 | Kun | 84/280 |
| 4,386,548 A | * | 6/1983 | Wolf | 84/280 |
| 5,270,474 A | | 12/1993 | Kun | 84/280 |
| 5,275,078 A | | 1/1994 | Wolf | 84/280 |
| 5,419,226 A | | 5/1995 | Kun | 84/280 |
| 5,567,893 A | | 10/1996 | Kun | 84/280 |
| 5,731,531 A | | 3/1998 | Kun | 84/280 |
| 6,031,163 A | * | 2/2000 | Cullum et al. | 84/279 |

FOREIGN PATENT DOCUMENTS

| | | | |
|---|---|---|---|
| DE | 3643225 | * | 7/1987 |

* cited by examiner

*Primary Examiner*—Shih-yung Hsieh
(74) *Attorney, Agent, or Firm*—Jones, Tular & Cooper, P.C.

(57) ABSTRACT

A shoulder rest for an instrument such as a violin or viola comprising an elongated support suitable for resting on a user's shoulder, ends of the support having attachment devices for holding the instrument spaced away from the support. The attachment devices each include a base part having a socket portion with an internal cavity, and a pedestal including a nut member rotatable within the cavity and having a threaded bore, and a normally upright threaded stem mounted in the threaded bore and carrying a clamping member engageable with the instrument back. The nut member has hand manipulatable means allowing it to be rotated manually within the cavity about the bore axis to raise or lower the stem relative to the base part so as to adjust the height of the clamping member relative to the support while the clamping member remains connected to the instrument.

17 Claims, 9 Drawing Sheets

SHOULDER REST FOR VIOLIN OR LIKE INSTRUMENT

BACKGROUND OF THE INVENTION

1. Field of the Invention

The present invention relates to shoulder resets for use with violins, violas, or other violin-like instruments.

2. Prior Art

Shoulder rests for violins and like instruments are known which provide a padded support spaced from the back of the instrument, with the spacing being adjustable. Such rests allow the user easily to position the instrument at the most comfortable playing position, irrespective of the build of the user. Prior patents showing such rests are as follows:

U.S. Pat. No. 3,631,754, issued Jan. 4, 1972 to Joseph Kun,

U.S. Pat. No. 5,270,474, issued Dec. 14, 1993 " " ",

U.S. Pat. No. 5,419,226, issued May 30, 1995 " " ";

U.S. Pat. No. 5,657,893, issued Oct. 22, 1996 to Michael Kun.

U.S. Pat. No. 5,731,531, issued Mar. 24, 1998 also to Michael Kun, and of which I am co-inventor.

These prior patents show shoulder rests comprising an elongated support suitable for resting on a user's shoulder, and pedestals upstanding from each end of the support and carrying clamping members for clamping to the edges of the instrument back. Each clamping member is associated with adjustment means for varying the height of the associated pedestal, so as to vary the spacing between the instrument back and the support and the longitudinal inclination of the support relative to the instrument back. Also, in each case the pedestals include pivot means allowing them to be tiltable sideways for varying the side or lateral inclination between the support and the instrument back. In the '754 and '474 patents, the latter means include pivots connecting the pedestals to a base part fixed to the support. In the '893 patent, a pedestal is connected to a base part by a bearing generally aligned with the support, and allowing similar tilting, and spring means are provided between the pedestal and the base part for urging the pedestal to a central position.

In the '226 and '531 patents, the pedestals are not only tiltable sideways as in the prior patents, but are also made foldable about transverse axes so that when the shoulder rest is removed from the instrument the pedestals can be folded inwards to bring the clamping members close to the elongated support. This reduces the height of the shoulder rest so that it can be fitted, along with the instrument, into a typical instrument case.

SUMMARY OF THE INVENTION

The present invention provides a shoulder rest which allows the same kind of adjustability as is provided in the patented constructions described above, and, like the '226 and '531 patents, also allows folding so that the rest can fit into an instrument case. However the mechanism of this invention provides advantages over the designs of the prior patents, especially in allowing for adjustment of the shoulder rest while it is on, or being attached to, the instrument; the adjustments do not require removal of the rest from the instrument, as hitherto. Also, the rest can be attached to the instrument without forcing the clamping members over the edges of the instrument back. Furthermore, the shoulder rest support has adjustment means to improve the fit on a user which are not available in the known rests.

According to one aspect of the present invention, a shoulder rest for an instrument such as a violin or, viola comprises an elongated support suitable for resting on a user's shoulder, and attachment means adjacent each end of the support for attachment to the instrument with the support spaced away from the back of the instrument, wherein at least one of said attachment means comprises:

a base part upstanding from the support, the base part having a socket portion with an internal cavity or recess;

a pedestal comprising a nut member fitted within the internal cavity or recess and having a threaded bore, the pedestal including a normally upright threaded stem mounted in said bore;

a clamping member carried by the stem and engageable with a back portion of said instrument, the socket portion having means for retaining the nut member while allowing its rotation about the axis of its bore, and wherein the nut member has hand manipulatable means allowing it to be rotated manually within the cavity or recess about the stem axis to raise or lower the stem relative to the base part and thereby to adjust the height of the clamping member relative to the support while the clamping member remains connected to the instrument.

The hand manipulatable means may include finger grip means on the side surfaces of the nut member, the socket portion being open at its sides to allow access to these side surfaces for rotating said nut member.

The base part may be connected to the support by means including a lead screw movable with the base part and which is threaded into a bore in a part solid with the support, whereby the lead screw allows the attachment means to be moved along the direction of the support; this allows the shoulder rest to be fitted onto an instrument back without being forced over the edges of the back.

The nut member, in addition to being rotatable about the stem axis, may also be pivotable to allow folding of the pedestal into alignment with the support after the rest has been removed from the instrument. For this purpose, the stem moves in a slot in the socket portion. The socket portion may have a lateral enlargement of the upper end of the slot, to also allow lateral tilting of the pedestal.

The nut member may have a projection at its upper end movable in the slot of the socket portion, and may also have a projection at its lower end. A spring member may be provided having an inner end fixed to the base part and having an outer end portion which engages the lower end projection to restrict the tilting motion of the pedestal. Where the pedestal folds, the spring member may be disengaged to allow the folding to occur. Instead of the lower end projection, the nut member may have a recess at its lower end receiving an upwardly projecting outer end of the spring member.

Instead of the pedestal being tiltable relative to the elongated support, the support may include an elongated member having end portions carrying shoulder pads which are themselves adjustable for lateral tilt relative to the member. Such shoulder pads may, alternatively, be angularly adjustable about a transverse axis so as to fit individual players' shoulders.

BRIEF DESCRIPTION OF THE DRAWINGS

Preferred embodiments of the invention will now be described by way of example with reference to the accompanying drawings, in which.

DETAILED DESCRIPTION

Figure 1:
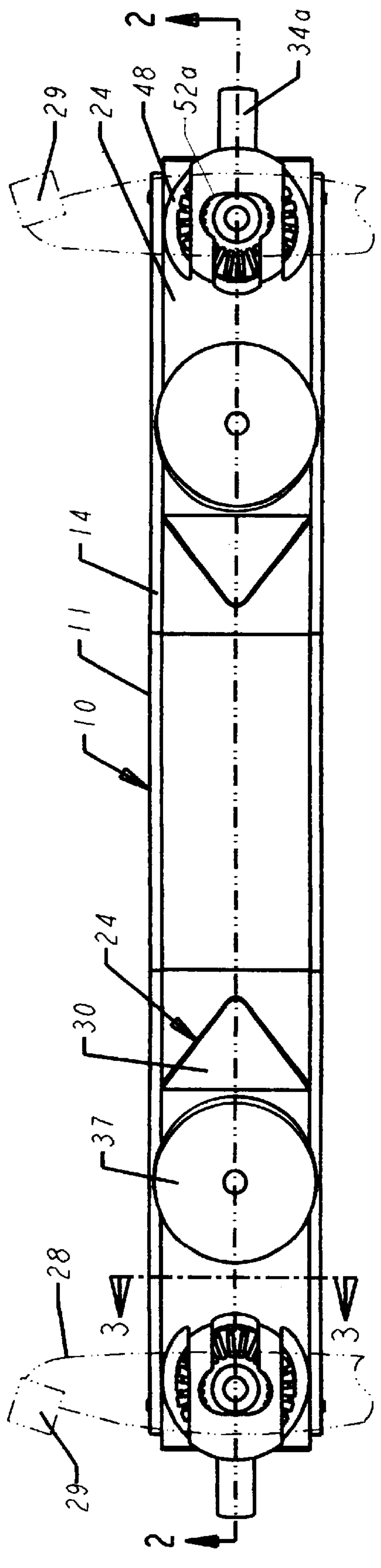
FIG. 1 is a top view of one embodiment of shoulder rest, with clamping members partly broken away.
Figures 2, 3, 8:
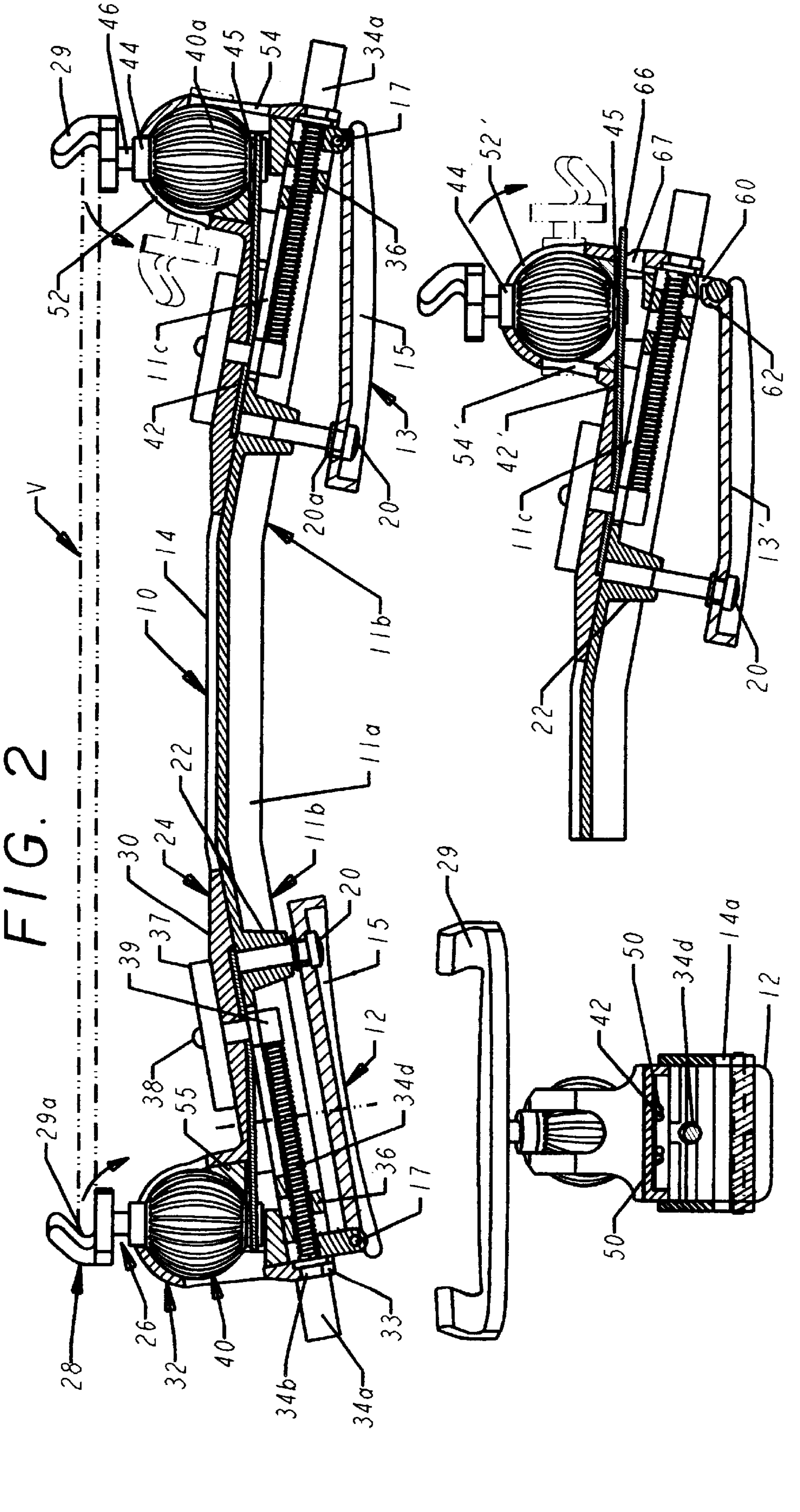
FIG. 2 is a partly sectioned side view of the shoulder rest.
FIG. 3 is a cross-sectional view on lines 3—3 of FIG. 1.
FIG. 8, which appears on the same drawing sheet as FIGS. 1 to 3, is a side, partly sectioned view on one end of a modified form of the shoulder rest.

FIGS. 1 and 2 show top and side views of a shoulder rest which includes an elongated support 10 suitable for resting on a user's shoulder. The support includes an elongated member 11 having a central portion 11*a* and downwardly sloping end portions 11*b* each carrying a shoulder pad 12, 13; in use these pads rest on spaced areas of a user's shoulder. In cross-section, the profile of member 11 is generally flat, but bounded by two side flanges 14 extending above and below its central portion.

As shown in FIGS. 2 and 3, the pads 12, 13 are each formed of a slightly curved molding, to the outer surface of which is attached a layer of resilient material, such as foam rubber 15, for contacting the shoulder. Pad 12 is slightly concave, while pad 13 is slightly convex. Each is positioned between lower extensions 14*a* of the flanges 14, and the pads are pivotally connected to the extensions 14*a* by transverse pivot pins 17. The height of each pad is adjustably fixed by a screw 20 rotatable in a bore near the inner end of the pad and held in place by a retaining washer 20*a*, and the threads of each screw engage in a threaded boss 22 depending from the underside of the support 10, so that the screws 20 can be used to adjust the angular position of the pads between the extended and retracted positions shown at the different ends of the rest in FIG. 2.

At each end of the rest is an instrument attachment means comprising a base part 24 on which is mounted a pedestal 26. A clamping member 28 carried by the pedestal has arms 29 with spaced apart recesses 29*a* which engage the slightly protruding edges of the back of a violin, which is indicated in broken lines at V in FIG. 2.

Since the attachment means at the ends are identical, only one will be described.

Figures 4, 5, 6, 7, 9, 10, 11, 12:
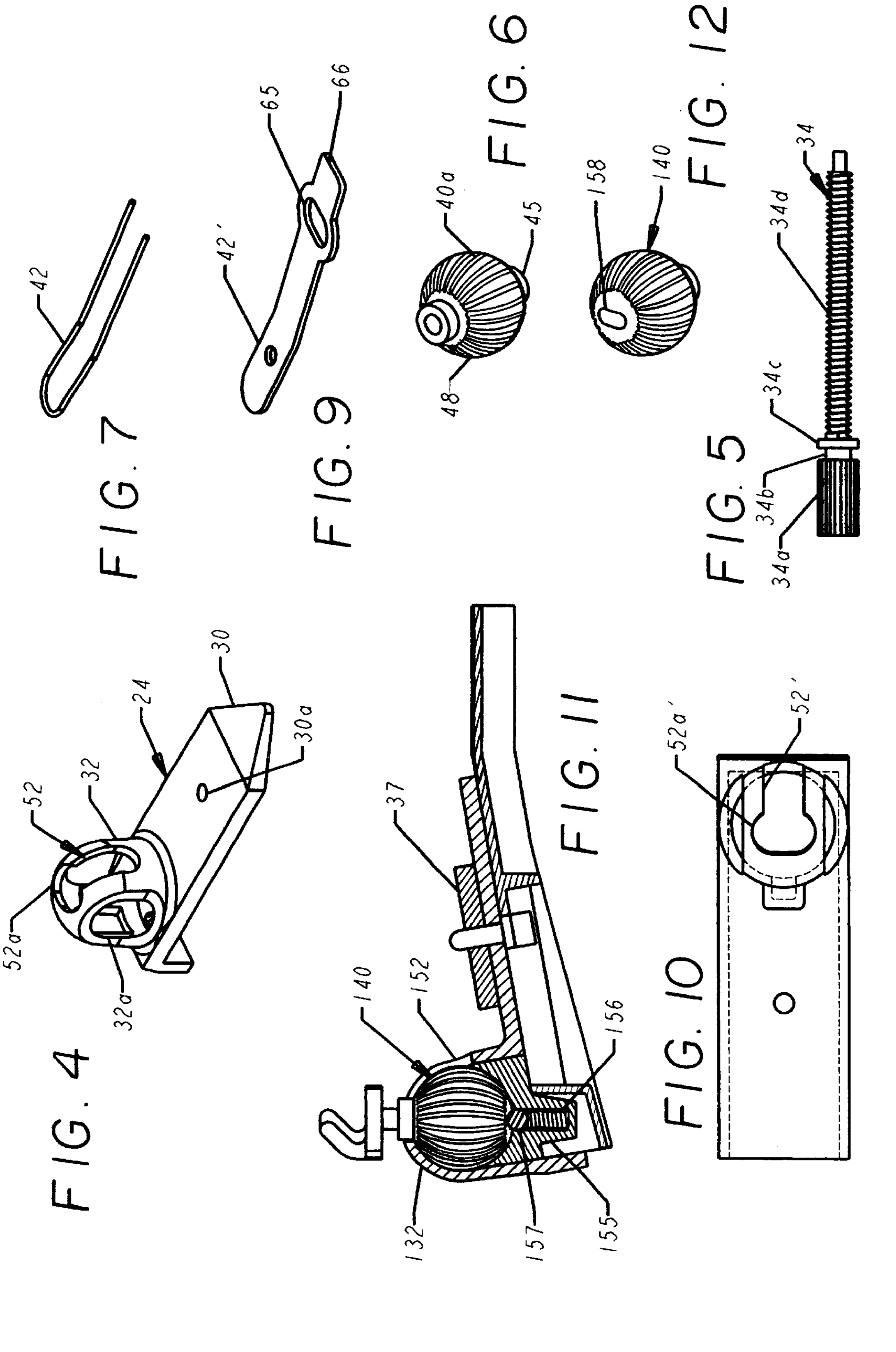
FIG. 4 is a perspective view of a component of the attachment means.
FIG. 5 is a view of a threaded shaft used in the attachment means.
FIG. 6 is a perspective view of a nut member used in the attachment means.
FIG. 7 is a perspective view of a spring member which can be used in the attachment means of FIGS.1 to 3.
FIG. 9 is a perspective view of a spring member which can be used in the attachment means of FIG. 8.
FIG. 10 is a top view of a base member which can be used in the attachment means of FIG. 8.
FIG. 11 is a sectional view of a modified attachment means.
FIG. 12 is a perspective, inverted, view of a component of the FIG. 11 embodiment.

The base part 24 is shown separately in perspective in FIG. 4. It is a molded member comprising a lower flange portion 30 integrally formed with an upstanding socket portion 32 having a part spherical internal cavity or recess. The flange portion has parallel sides which slide between the upper parts of flanges 14 of the support 10 which provide a guideway extending generally longitudinally of the support. The base part is adjustable longitudinally and in a continuous manner by means of a lead screw 34, shown separately in FIG. 5, which also extends longitudinally of the support and which has a knurled adjustment knob 34*a* at its outer end, a short shaft portion 34*b* ending in a flange 34*c*, and a threaded portion 34*d*. The shaft portion 34*b* is a snap fit into a recess in the lower extension 33 of the outer end of the socket portion 32, while the lead screw 34*d* is threaded into lugs 36 which are parts solid with the outer end of the support 10. The inner end of the lead screw acts on a clamping member 39 having a spindle 38 held by locking knob 37. The clamping member 39 has side recesses slidably retained by the sides of a central, longitudinal slot 11*c* in the elongated member 11, the spindle 38 passing through an aperture 30*a* in the flange 30. This allows the lead screw to be rotated in the lugs 36 to move the base part inwardly until the clamping member 28 is in proper position to grip the back of the violin, at which point the position of the base part is secured by tightening the locking knob 37. This allows precise positioning of the attachment means, and avoids forcing the clamping members over the edges of an instrument back.

Other elements of the attachment means, namely a nut member 40, and a control spring 42 formed of wire, are shown separately in FIGS. 6 and 7. The nut member 40 is largely spherical, comprising a ball 40*a* which fits closely within the cavity or recess of the socket 32, and which has respective upper and lower projections 44 and 45 which are coaxial with a screw threaded bore which receives an interfitting threaded stem 46 carrying the clamping member 28. The ball 40*a* is held in place by a plug or retainer 55 illustrated in FIG. 2.

As will be seen in FIG. 4, the sides of the socket member 32 have apertures 32*a* which expose sides of the ball 40*a*, and these apertures allow access to ribs 48 on the sides of the ball. The ribs 48 are finger grip means which allow the ball 40*a* to be rotated between a user's fingers to adjust the height of the stem and thereby to adjust the pedestal height; this may be done while the rest remains attached to the violin.

The ball 40*a*, and therefore the pedestal, can also tilt laterally as allowed for by the upper projection 44 moving in a an opening provided by a lateral enlargement 52*a* of a slot 52 which extends down the inner side of the socket. The tilt of the pedestal is controlled by the steel control spring 42, shown separately in FIG. 7. This spring has a hairpin shape, and the legs of the spring are held between the underside of the flange 30 and the top of the support 10. The legs of the spring fit against the sides of the lower ball projection 45, with the sideways movement of the legs being restricted by lugs 50 depending from the elongated member 11, as shown in FIG. 3.

The slot 52 extends about 90° from the top of the socket down the inner side of the socket member to the mid level of ball 40*a*, as shown in FIG. 2, and the outer side of the socket member has its lower end portion provided with a wide slot 54 shown in FIG. 2 which can accommodate the lower projection 45. These slots allow the nut member 40 and pedestal to be pivoted into the downwardly folded position indicated at the right side of FIG. 2. Since the legs of spring 42 are open at the outer end these do not interfere with this movement. Also, the retainer 55 is recessed to allow the lower projection 45 to move both for the folding and the tilting.

FIG. 8 shows a variation in which the shoulder pad 13' is connected to the support without the use of a pivot pin, and in which the pedestal is made to fold outwardly, instead of inwardly.

Here, the outer end of the support has a depending portion with two laterally spaced slots 60. The pad 13' has a pair of laterally spaced, outwardly projecting tabs 62, each fitting into one of the slots. After the pad has been located with the tabs in the slots, the screw 20, as in the previous embodiment, is threaded into the boss 22, and together with washer 20*a* holds the pad in place at a height adjustable by the screw 20.

The pedestal of FIG. 8 is arranged to fold outwardly, firstly, by provision of a slot 52' in the outeride of the socket 32, which, when the pedestal is folded outwards through about 90°, accommodates the upper projection 44, and secondly by the provision of a slot 54' on the lower inside of the socket which accommodates the lower extension 45 on such folding. The slot 52' has a lateral enlargement 52*a'* at the top to allow for tilting of the nut member, as shown in FIG. 10.

Another change here is that the wire spring 42 is replaced by a plastic spring 42', shown separately in FIG. 9. This has a laterally elongated aperture 65 near its outer end which receives the projection 45 at the lower end of the nut member 40 and allows tilting of the ball, and beyond this aperture is a tab 66. The tab extends out of the socket 32 via an aperture 67 in the outer side of the socket member, and allows the spring to be pressed down by a finger to release it from the ball projection 45. This then permits the pedestal to be folded down through 90° into the broken line position of FIG. 8, with the upper ball extension 44 sliding in the slot 52' and the lower projection sliding in the slot 54'.

FIG. 11 shows a further variation of the invention in which a socket member 132 has a nut member 140, generally similar to nut member 40, and has a slot 152 which allows the nut member and pedestal to be folded inwardly. Here however the nut member, which is shown separately, and inverted, in FIG. 12, is held in place by a pre-molded plug of material 155 having a bore through which extends a spring 156 holding a steel ball 157 against the lower end of the nut member 140. This lower end of the nut member has a laterally elongated dimple 158, as shown (at the top) in FIG. 12. The combination of the dimple and the ball allow the ball to tilt sideways, and also provide a detent which normally retains the pedestal in the upright position, while allowing it to be folded inwardly.

In FIG. 11 the pad 12 and associated parts are not shown, but may be similar to the arrangement of FIGS. 1–3.

Figure 15C:
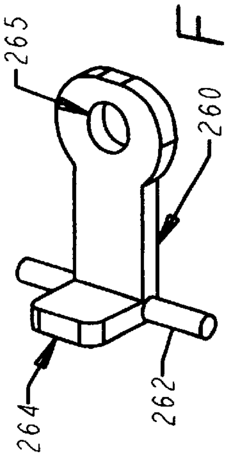
FIG. 15*c* is a view of a further component of the FIG. 13 construction.
Figure 15B:
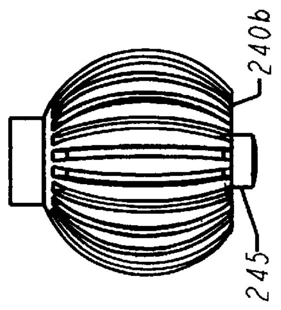
FIGS. 15*a* and 15*b* are respectively sectional and elevational views of the nut component used in the FIG. 13 construction.
Figure 15A:
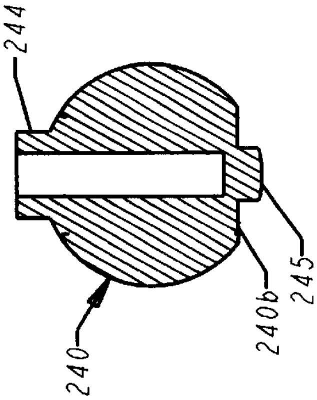
Figure 13:
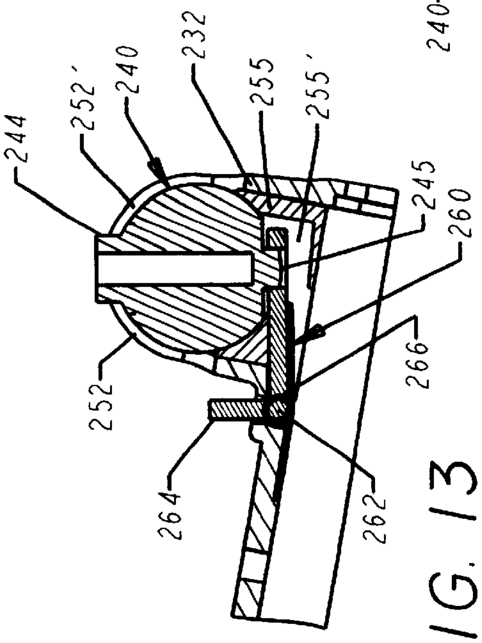
FIG. 13 is a view similar to FIG. 8 of a further variation of the attachment means.

FIG. 13 shows another possible arrangement of socket and nut member. Here the socket member 232 has is fitted with a bottom plug 255 having an internal surface holding the nut member 240 in position, and has slots 252 and 252' on the inner and outer sides, permitting its top projection 244 to pivot with the nut member either inwardly or outwardly, in each case through about 90°. As best seen in FIGS. 15*a* and 15*b*, the ball 240*a* of the nut member 240 has a flattened, recessed area 240*b* surrounding the lower projection 245, which projection is arranged to be totally within the outer radius of the ball so that this lower projection does not interfere with movement of the ball in the socket. A pivot control plate 260, shown separately in FIG. 15*c*, has an outer end which fits within a cavity 255' in the plug 255, and normally rests against the area 240*b* and has a bore 265 for receiving the lower protrusion 245; this normally holds the nut member in the upright position shown. Plate 260 is mounted on a lateral pivot 262 and is pivotal to release the projection 245 by finger pressure applied to a release lever 264. A coil spring 266 normally holds the plate in the position shown to prevent folding movement of the nut member, the plate 260 being releasable, either for inside or outside folding, by pushing on lever 264.

Figure 16:
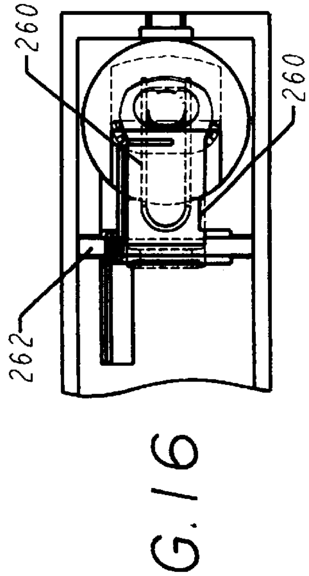
FIG. 16 is a view similar to FIG. 14 of a variation of the FIG. 13 construction.

In the FIG. 13 construction, there is no lateral tilting of the nut member, and thus no need for enlargement of the top of the slots 252 or 252'. However, FIG. 16 shows a construction in which the part of the plate 260 adjacent to the nut member 240 is replaced by a spring member 260', and this, together with an enlargement at the top of the slots 252 and 252', will allow for lateral tilting.

It may be preferred to use only outward or only inwards folding; in the latter case one of the slots 252 and 252' would be eliminated.

Figure 14:
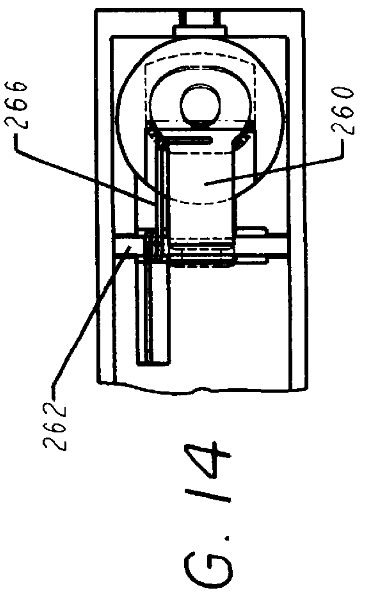
FIG. 14 is a bottom view, on lines 14—14 of FIG. 13, of the FIG. 13 construction.
Figure 20:
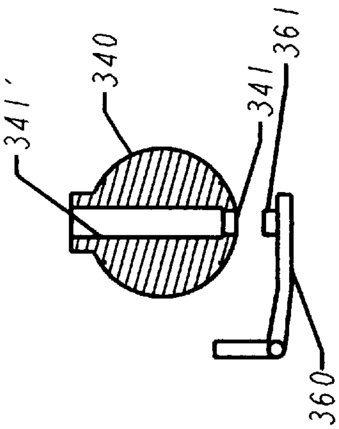
FIG. 20 is a view of two components of the FIG. 17 construction.
Figure 19:
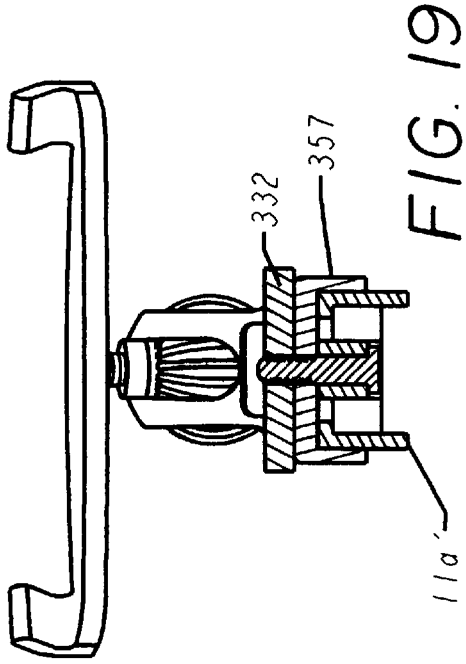
FIG. 19 is a sectional view of the attachment means on lines 19—19 of FIG. 18.
Figure 17:
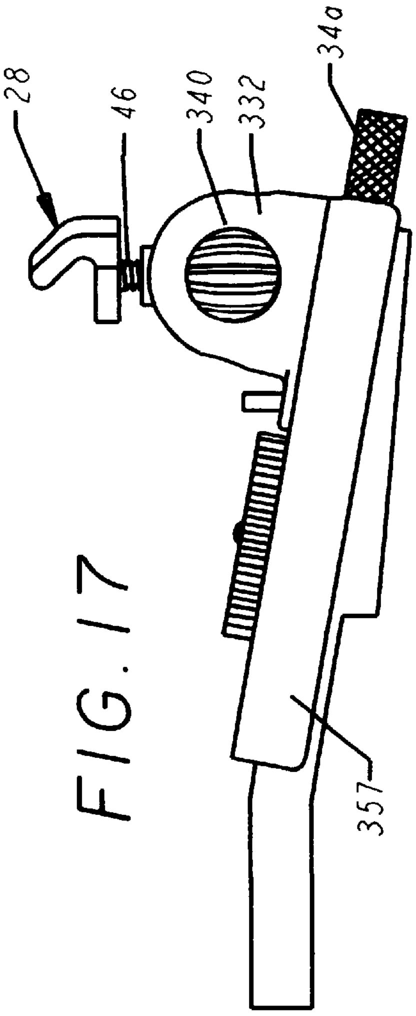
FIG. 17 is an elevational view of another variation of the attachment means.
Figure 18:
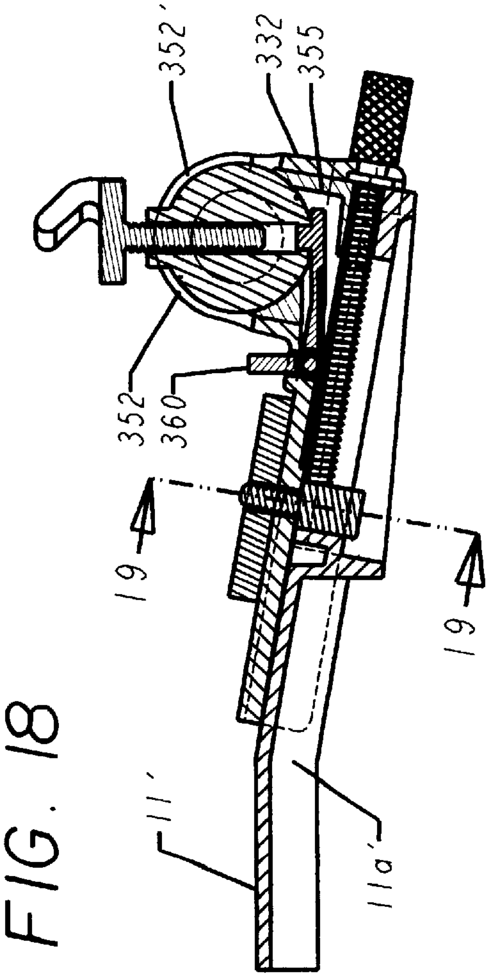
FIG. 18 is a sectional elevation of the FIG. 17 construction.

FIGS. 17 to 20 show views of a further variation, similar to that of FIGS. 13 and 14, but in which the nut member 340, instead of having a projection at its lower end, has a recess 341 leading to the central bore 341' which receives the spindle 46 of the clamping member 28. The recess 341 is engaged by a protrusion 361 at the end of pivot control plate 360. The socket member 332 has slots 352 and 352' allowing pivoting through 90° both inwardly and outwardly. As in the previous embodiment, the ball is held in place by a molded plug 355. In both this and the previous embodiment, the molded plug may be made with detent portions which snap into the apertures at the side of the socket part 232, 332 to hold it in place.

Another difference between the construction of FIGS. 17 to 20 and the earlier constructions is that here the socket member is mounted on the elongated member 11' by means of a sliding bracket 357 having depending flanges which overlap depending flanges 11*a'* of the elongated member.

Figures 21, 22, 23, 24:
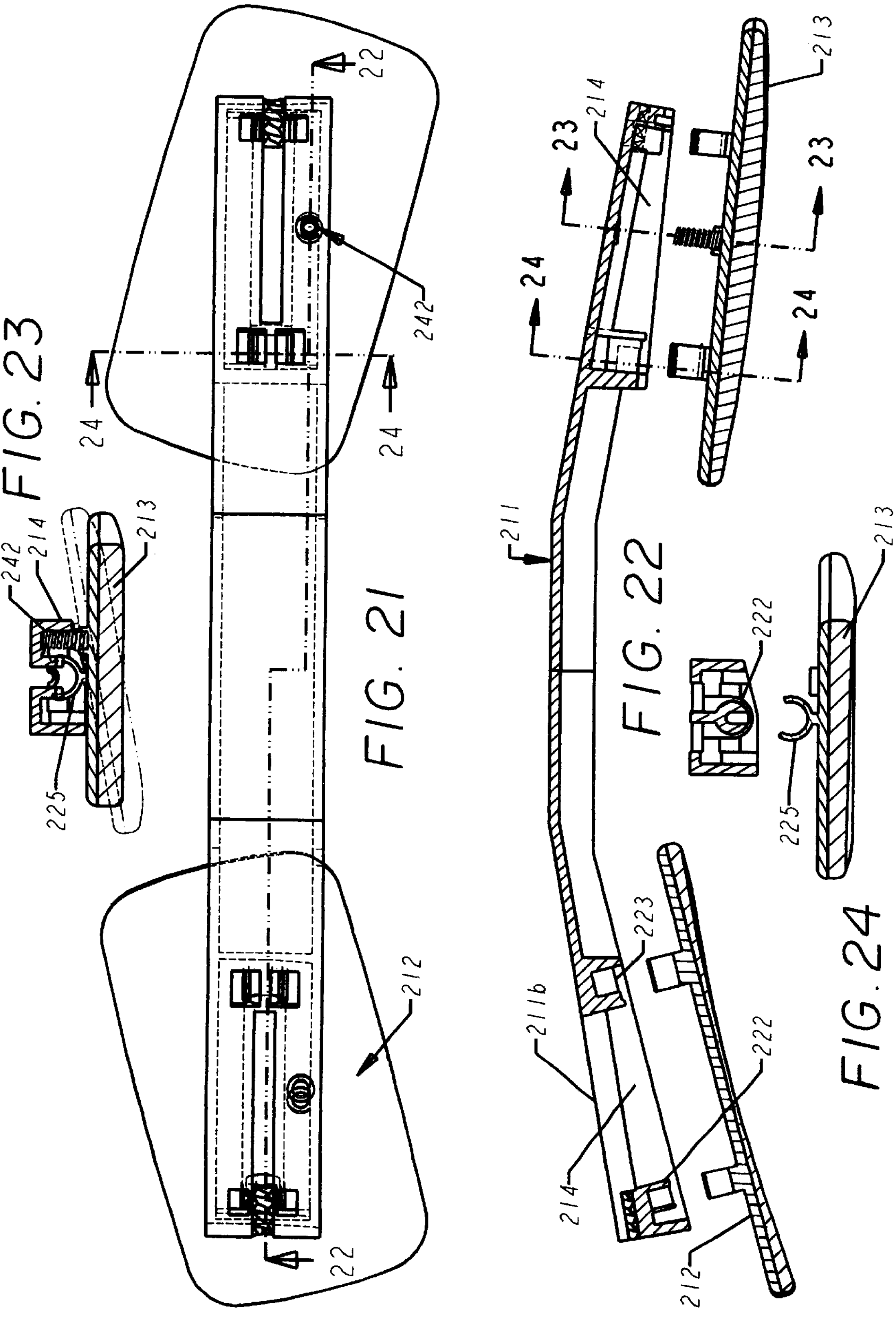
FIG. 21 is a top view of the support of a modified shoulder rest, without its attachment means.
FIG. 22 is a sectional, disassembled view of the support on lines 22—22 of FIG. 21.
FIG. 23 is a cross-sectional view of a shoulder pad and base member, on lines 23—23 of FIG. 21.
FIG. 24 is a view on lines 24—24 of FIG. 22, with the parts disassembled.

To allow a tilt adjustment with the attachment members of FIGS. 13 or 14, or of FIGS. 17 to 20, the shoulder pads themselves may be arranged to tilt relative to the elongated member which carries them; such a construction is shown in FIGS. 21 to 24. Here, the sloping end portions 211*b* of the elongated member 211 each have a pair of longitudinally spaced, undercut protuberances 222, 223, which are of part cylindrical form and are coaxial; these receive, as a snap fit, part cylindrical recesses of clip members 225 protruding from the upper sides of shoulder pads 212, 213. This arrangement allows for tilting of the shoulder pads between angular positions determined by the interaction of the elongated member flanges 214 and the upper surfaces of the shoulder pads; the angle of tilt is indicated in FIG. 23. The tilting is such that no part of the shoulder rest, apart from the clamping members, can touch the back of an instrument to which it is attached; such touching and scraping is sometimes a problem with known tilting mechanisms. As shown in FIGS. 21, 22 and 23, a compression spring 242 may be held between opposed recesses in the bottom of the elongated member 211 and the top of a shoulder pad 213, tending to return the shoulder pad to the full line FIG. 23 position.

Figures 25, 26, 27:
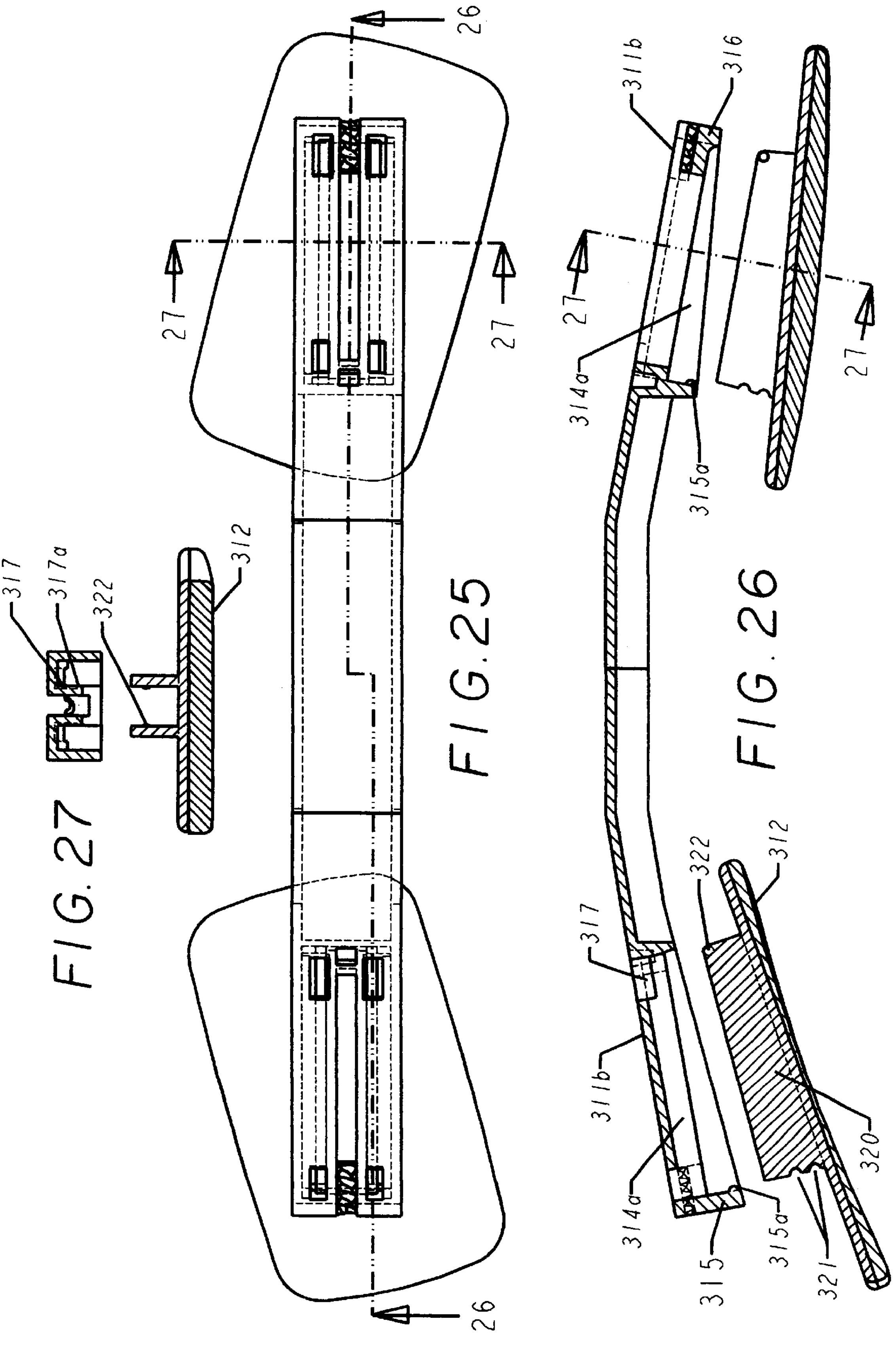
FIG. 25 is a view similar to FIG. 21 of yet another construction of support.
FIG. 26 is a view on lines 26—26 of FIG. 25.
FIG. 27 is a cross-sectional view on lines 27—27 of FIGS. 25 and 26.

FIGS. 25 to 27 show a further construction of support where the shoulder pads, while not tiltable, are angularly adjustable about a transverse pivot axis, as in the first embodiment. The downwardly sloping end portions 311*b* of the elongated member 311 have side flanges 314*a*, an end flange 315 with an inner rib 315*a*, and an opposite end flange 316 from which protrudes a central formation 317 with outwards facing dimples 317*a*, best seen in FIG. 27. One shoulder pad 312 has a pair of parallel flanges 320 with several vertically spaced recesses 321 at their ends, and has inwardly facing detents or protrusions 322 at their inner ends. The pad is put in place by setting a selected recess 321 onto the rib 315*a*, and then pushing the other end of the pad inwards so that its detents 322 snap into the dimples 317*a*. The several recesses 321 allow for an adjustment of the angle of the pad about the axis provided by the dimples and detents.

Instead of having a foam rubber or similar padding on the lower surface of the shoulder pads, these may be molded with ribs providing a non-slip surface.

Figure 30:
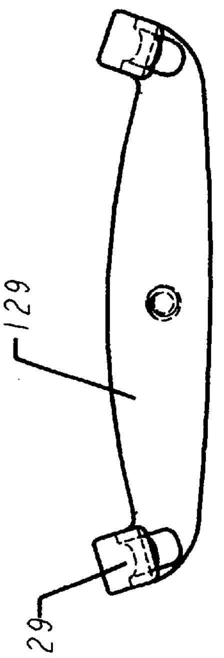
FIG. 30 is a top view of the same clamping member.
Figure 29:
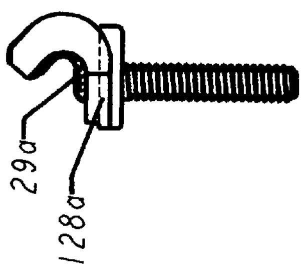
FIG. 29 is a side view of the same clamping member.
Figure 28:
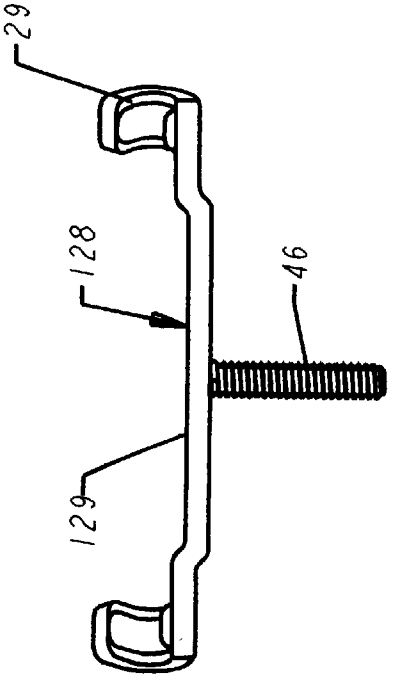
FIG. 28 is an inside view of a clamping member.

FIGS. 28 to 30 show an alternative construction of clamping member 128. This has a lowered central section 129 designed to be clear of the instrument back. The whole internal surface of the clamping member may be provided with a rubber pad 128*a*, indicated in FIG. 29.

Figures 31, 32:
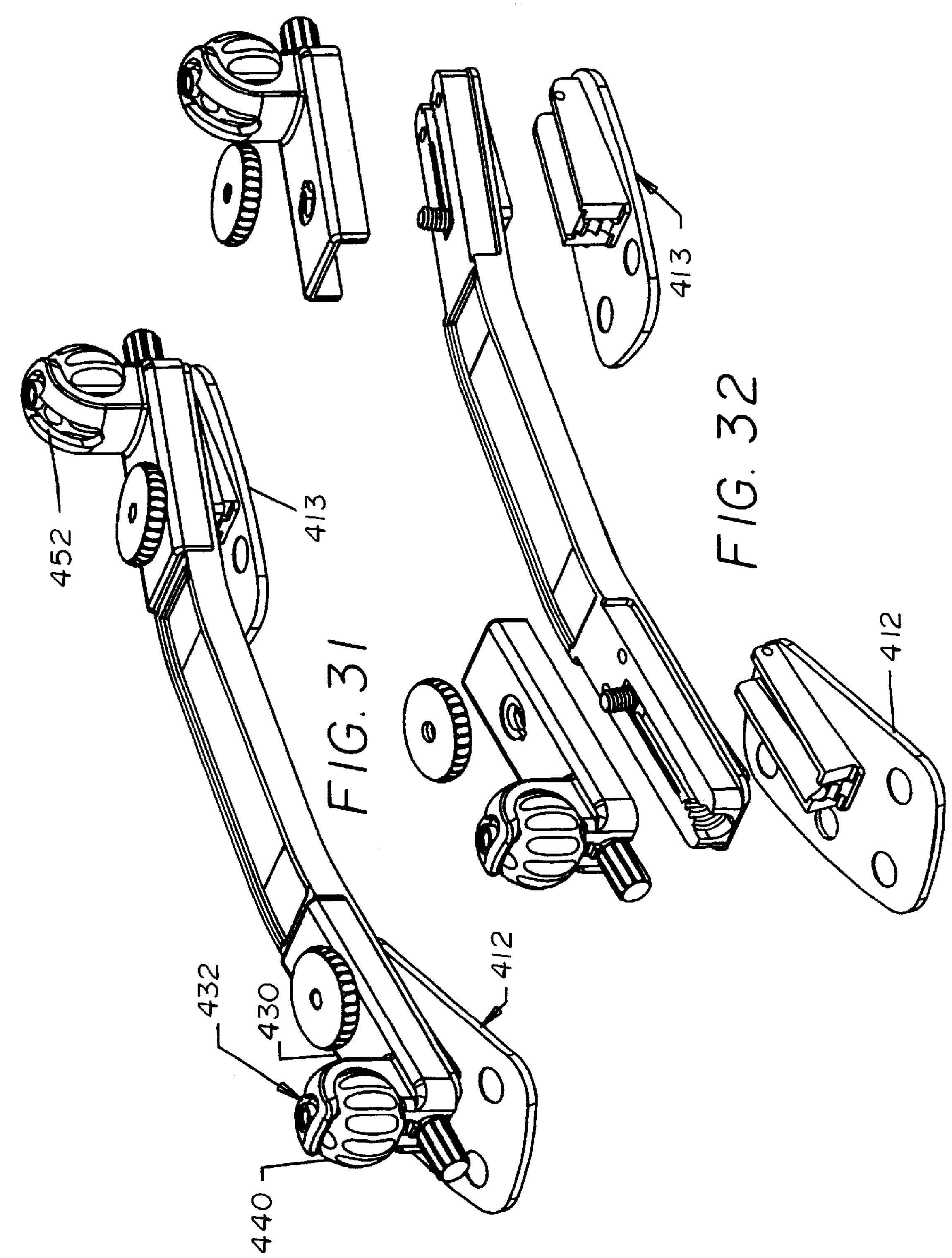
FIG. 31 is a perspective view of a modified form of the shoulder rest.
FIG. 32 is a similar but exploded view of the same modified support.

FIGS. 31 and 32 show a shoulder rest generally similar to that described above, but with modifications. The socket portion 432 has been altered to provide easier access by a user's fingers to the nut member 440, and has been reduced to a curved member having a spherically curved recess its side, the curved socket member leading from the lower flange portion 430 to the top of the nut member. This curved member has a slot 452 which allows a clamping member (not shown in FIG. 31) attached to nut member 440 to be folded through about 90° inwardly when the rest is stored. The upper end of the slot has an enlargement similar to that shown at 52*a* in FIG. 4, so that the clamping member can also tilt laterally. The shoulder pads 412, 413 are similar to those of FIGS. 21 to 24, but are provided with a rubberized inlay on their lower surfaces, to reduce slipping on the user's shoulders.

I claim:

1. A shoulder rest for a violin-like instrument comprising an elongated support suitable for resting on a user's shoulder, and attachment means adjacent each end of the support for attachment to the instrument with the support spaced away from the back of the instrument, wherein at least one of said attachment means comprises:

a base part upstanding from the support, said base part having a socket portion with a recess;

a pedestal comprising a nut member fitted within said recess and having a threaded bore, the pedestal including a normally upright threaded stem mounted in said threaded bore, a clamping member carried by said stem and terminating in means engageable with a back portion of said instrument, said socket portion having means for retaining the nut member while allowing its rotation about the axis of said bore, and wherein said nut member has hand manipulatable means allowing it to be rotated manually within said recess about said axis of the bore to raise or lower said stem relative to the base part and thereby to adjust the height of the clamping member relative to the support while the clamping member remains connected to the instrument.

2. A shoulder rest according to claim 1, wherein said hand manipulatable means are side surfaces of the nut member with finger grip means, and wherein said socket portion is open at its sides to allow access to said side surfaces for rotating said nut member.

3. A shoulder rest according to claim 1, wherein said nut member, in addition to being rotatable about said stem axis, is also pivotable about a pivot axis transverse to the support and to the stem axis, to allow the stem to be folded into alignment with the support when the rest is detached from a violin.

4. A shoulder rest according to claim 3, wherein said nut member and recess are both partly spherical, and wherein said socket portion has a slot allowing the nut member and attached stem to pivot through approximately 90° about said pivot axis to allow folding of the pedestal.

5. A shoulder rest according to claim 4, wherein said socket portion has a top opening which allows limited lateral tilting of the pedestal, and wherein said nut member has a projection at its lower end, and wherein a spring member is provided having an inner end fixed to the base part and having an outer end portion which engages said projection to restrict tilting movement of the pedestal when the pedestal is in its normal upright position, said spring being capable of being disengaged to allow folding movement of the pedestal about said pivot axis.

6. A shoulder rest according to claim 4, wherein said slot allows the nut member to pivot inwardly towards the center of the rest.

7. A shoulder rest according to claim 5, wherein the spring member has an outwardly extending end portion forming a tab which is manually depressible to release the nut member from an aperture in the spring member and allow it to be folded.

8. A shoulder rest according to claim 1, wherein said socket portion has a top opening which allows limited lateral tilting of the pedestal, and wherein said nut member has a projection at its lower end, and wherein a spring member is provided having an inner end fixed to the base part and having an outer end portion which engages said lower end projection to restrict tilting movement of the pedestal.

9. A shoulder rest according to claim 1, wherein the base part is connected to the support by means including a lead screw movable with the base part and which is threaded into a bore in a part solid with the support, whereby the lead screw allows the attachment means to be adjusted along the direction of the support.

10. A shoulder rest according to claim 9, wherein the lead screw is hand rotatable by an adjusting knob accessible from an adjacent end of the support.

11. A shoulder rest according to claim 1, wherein said elongated support includes an elongated member having end portions to which are attached spaced shoulder pads, and wherein at least one of said shoulder pads is angularly adjustable relative to the elongated member.

12. A shoulder rest for a violin-like instrument, comprising an elongated support suitable for resting on a user's shoulder, and attachment means adjacent each end of the support for attachment to the instrument with the support spaced away from the back of the instrument, wherein at least one of said attachment means comprises a base part upstanding from the support, a pedestal including a normally upright stem, and a clamping member carried by said stem and terminating in means engageable with a back portion of said instrument, wherein said base part is connected to the support by means including a guideway extending longitudinally of the support and a lead screw also extending longitudinally of the support and movable with the base part and which is threaded into a part solid with the support, whereby rotation of the lead screw moves the attachment means along the direction of the support.

13. A shoulder rest according to claim 12, wherein the lead screw is hand rotatable by an adjusting knob accessible from an adjacent end of the support.

14. A shoulder rest for a violin-like instrument, comprising an elongated support suitable for resting on a user's shoulder, and attachment means adjacent each end of the support for attachment to the instrument with the support spaced away from the back of the instrument, wherein at least one of said attachment means comprises a base part upstanding from the support, a pedestal including a normally upright stem, and a clamping member carried by said stem and terminating in means engageable with a back portion of said instrument, wherein said elongated support includes an elongated member having end portions to which are attached spaced shoulder pads, and wherein at least one of said shoulder pads is angularly adjustable relative to the elongated member.

15. A shoulder rest according to claim 14, wherein said one shoulder pad is angularly adjustable about a transverse pivot axis adjacent an end of the elongated member.

16. A shoulder rest according to claim 14, wherein said one shoulder pad is angularly tiltable about an axis extending generally along the elongated member.

17. A shoulder rest according to claim 14, wherein both said shoulder pads are angularly tiltable about axes extending generally along the elongated member.

* * * * *